US009103429B2

(12) United States Patent
Wiens et al.

(10) Patent No.: US 9,103,429 B2
(45) Date of Patent: Aug. 11, 2015

(54) RESERVOIR ASSEMBLY WITH BREATHER VENT

(71) Applicant: Deere & Company, Moline, IL (US)

(72) Inventors: Scott R. Wiens, Cedar Falls, IA (US);
Randall K. Bill, Cedar Falls, IA (US);
Jarrod A. Lemire, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 157 days.

(21) Appl. No.: 13/919,338

(22) Filed: Jun. 17, 2013

(65) Prior Publication Data

US 2014/0366956 A1  Dec. 18, 2014

(51) Int. Cl.
| | |
|---|---|
| *B60K 15/035* | (2006.01) |
| *B60K 15/06* | (2006.01) |
| *F16H 57/027* | (2012.01) |
| *F02M 37/00* | (2006.01) |
| *F16H 57/04* | (2010.01) |
| *F16H 57/037* | (2012.01) |
| *B60K 15/03* | (2006.01) |
| *E02F 9/08* | (2006.01) |

(52) U.S. Cl.
CPC ............. *F16H 57/027* (2013.01); *B60K 15/06* (2013.01); *F02M 37/0088* (2013.01); *F16H 57/037* (2013.01); *F16H 57/045* (2013.01); *F16H 57/0483* (2013.01); *B60K 2015/03118* (2013.01); *E02F 9/0883* (2013.01)

(58) Field of Classification Search
CPC .. F16H 57/027; F02M 37/0088; B60K 15/06; B60K 2015/03118
USPC ......... 137/263, 265, 571, 589, 575; 74/606 R
See application file for complete search history.

(56) References Cited

U.S. PATENT DOCUMENTS

| 3,096,390 A | 7/1963 | Deniau |
| 4,288,086 A | 9/1981 | Oban et al. |
| 5,058,621 A | 10/1991 | Thumm |
| 5,738,380 A | 4/1998 | Zipser et al. |
| 2010/0024591 A1 | 2/2010 | Yamaguchi |

FOREIGN PATENT DOCUMENTS

| GB | 1168489 A | 10/1969 |
| GB | 2482958 A | 2/2012 |
| JP | 5888064 U | 6/1983 |
| JP | 2007170487 A | 7/2007 |

OTHER PUBLICATIONS

Deere & Company, 8R Diff Case Venting, no date, 1 page (used in production before present invention).
European Search Report issued in counterpart application No. 14170335.5, dated Sep. 25, 2014, (8 pages).

*Primary Examiner* — Atif Chaudry

(57) ABSTRACT

A vehicle hydraulic oil reservoir assembly includes a main reservoir and an auxiliary reservoir. The main reservoir has a lower portion and an upper portion. The auxiliary reservoir has a lower portion and an upper portion. The auxiliary reservoir has a port formed in the upper portion thereof. The lower portion of the auxiliary reservoir is communicated with the lower portion of the main reservoir. A breather vent is in communication with atmosphere. A vent pipe communicates the port with the breather vent.

2 Claims, 6 Drawing Sheets

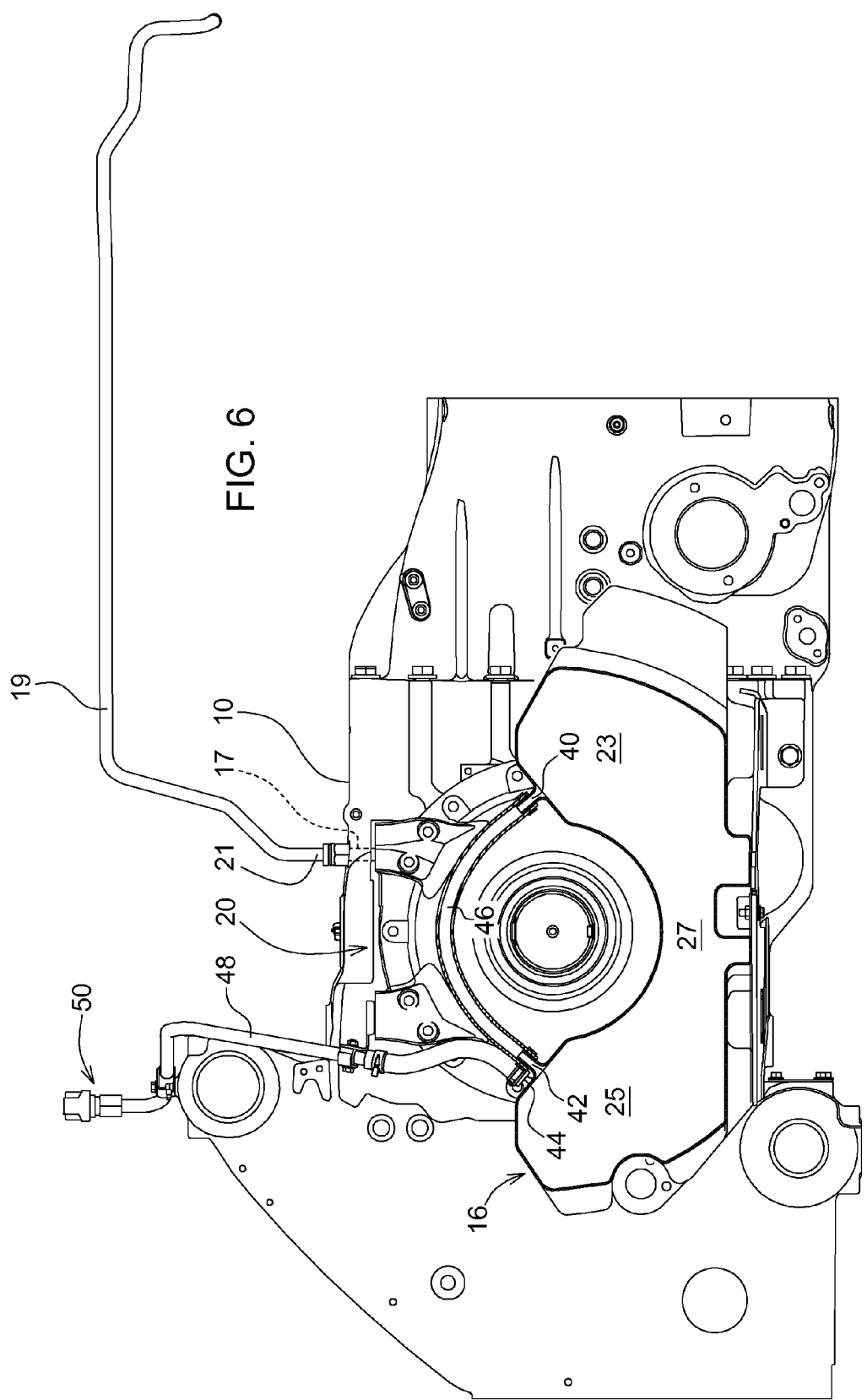

RESERVOIR ASSEMBLY WITH BREATHER VENT

FIELD

The present disclosure relates to a hydraulic oil reservoir assembly for a vehicle.

BACKGROUND

Utility vehicles, such as tractors, include a main hydraulic oil reservoir and at least one auxiliary reservoir. On current production tractors, the auxiliary reservoirs have air vent lines that communicate back to the upper end of the main reservoir. With such an arrangement, when a towed implement, such as a wagon with a dump cylinder is coupled to the tractor hydraulic system, oil will be drawn out of the main reservoir. In such situations, the main reservoir oil level will always be below the auxiliary reservoir oil level, and the main reservoir can be emptied while unused oil remains in the auxiliary reservoir. If the main reservoir oil level gets too low, no more oil can be supplied to the dump cylinder, and extra, unused oil will remain in the auxiliary reservoir.

Previously, EH valves and extra pumps have been used to insure the maximum amount of oil is used from the auxiliary reservoir. However, such components are costly and require control software and wiring harness integration and place an extra hydraulic load on the tractor.

SUMMARY

According to an aspect of the present disclosure, a vehicle hydraulic oil reservoir assembly includes a main reservoir and a pair of auxiliary reservoirs. The main reservoir has a lower portion and an upper portion. The first auxiliary reservoir has a lower portion and an upper portion. The first auxiliary reservoir has a first port formed in the upper portion thereof. The lower portion of the first auxiliary reservoir is communicated with the lower portion of the main reservoir. A further auxiliary reservoir has a lower portion and an upper portion. The further auxiliary reservoir has a further port formed in the upper portion thereof. The lower portion of the further auxiliary reservoir is also communicated with the lower portion of the main reservoir. A first breather vent is in communication with atmosphere. A first vent pipe communicates the first port with the breather vent. A further breather vent is also in communication with atmosphere, and a further vent pipe communicates the further port with the further breather vent. The breather vents cause the auxiliary reservoirs to empty before the main reservoir, so that all of the available oil can be utilized.

BRIEF DESCRIPTION OF THE DRAWINGS

FIG. 6 is a view taken along lines 6-6 of FIG. 3.

DETAILED DESCRIPTION OF THE DRAWINGS

Figure 1:
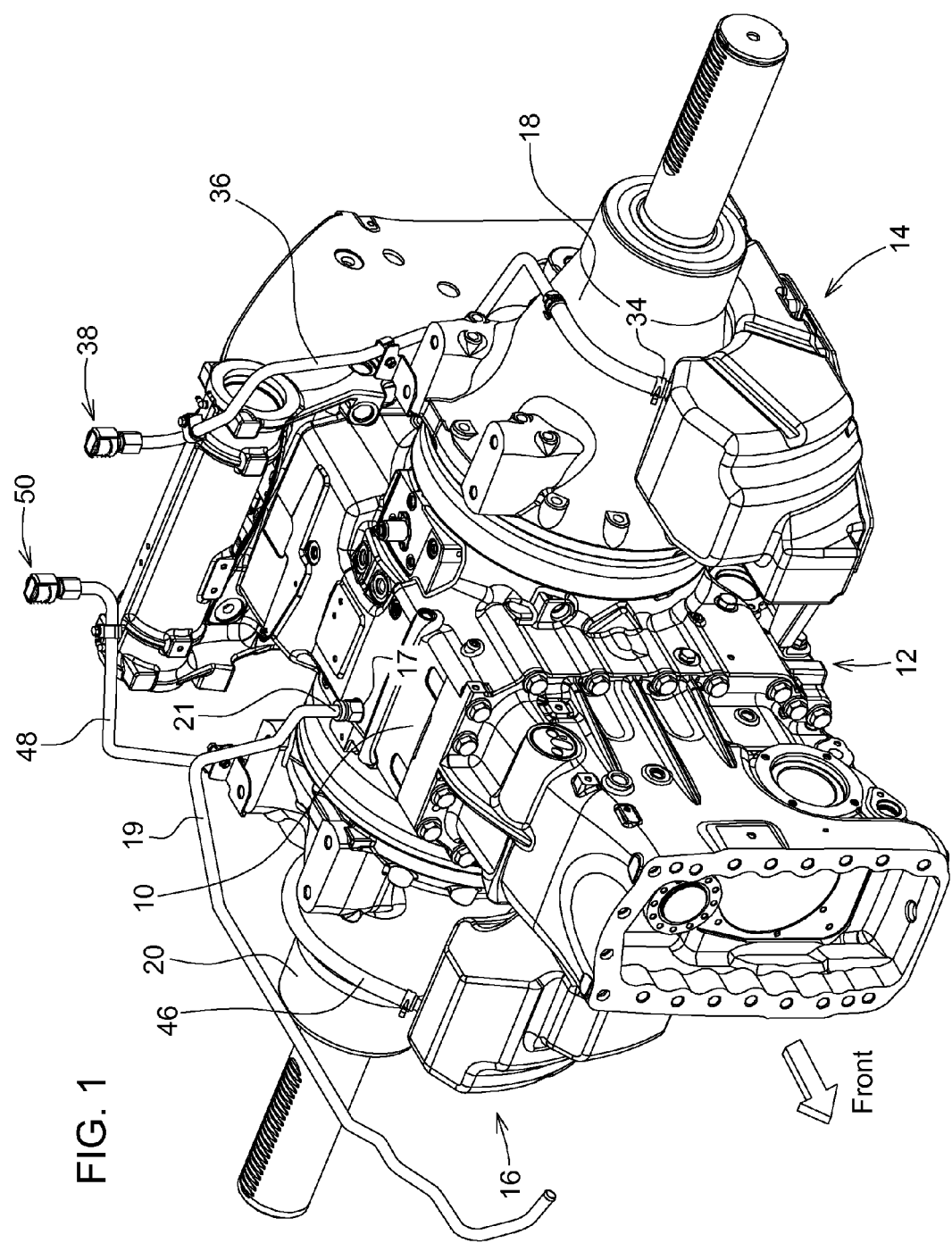
FIG. 1 is a perspective view of an oil reservoir assembly embodying the invention.
Figure 2:
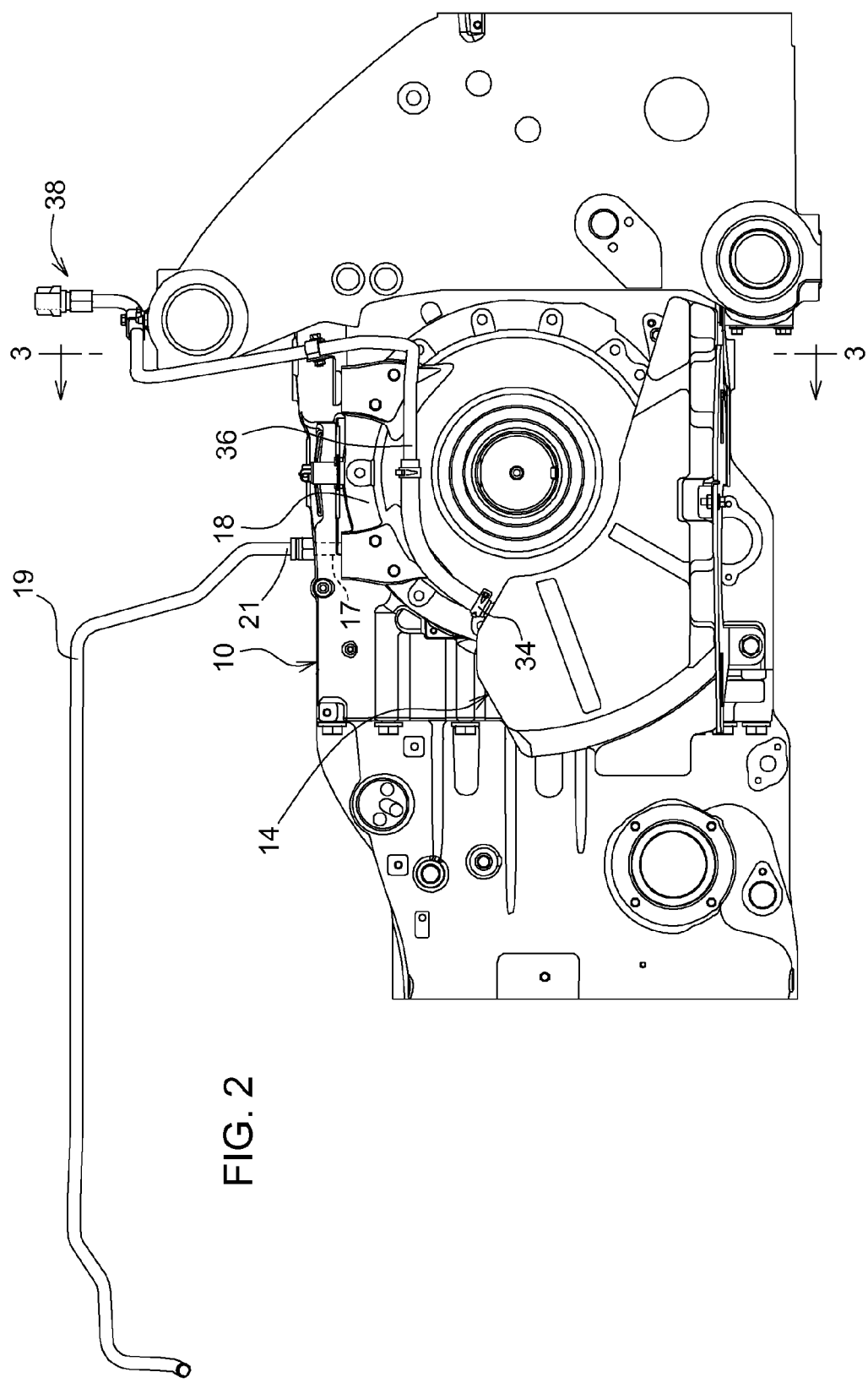
FIG. 2 is a left side view of the oil reservoir assembly of FIG. 1.

Referring to FIGS. 1 and 2, a vehicle differential case 10 encloses a main hydraulic oil reservoir 12. Left and right auxiliary oil reservoirs 14 and 16 are mounted outboard of the differential case 10 and below corresponding left and right inner axle housings 18 and 20.

Figure 3:
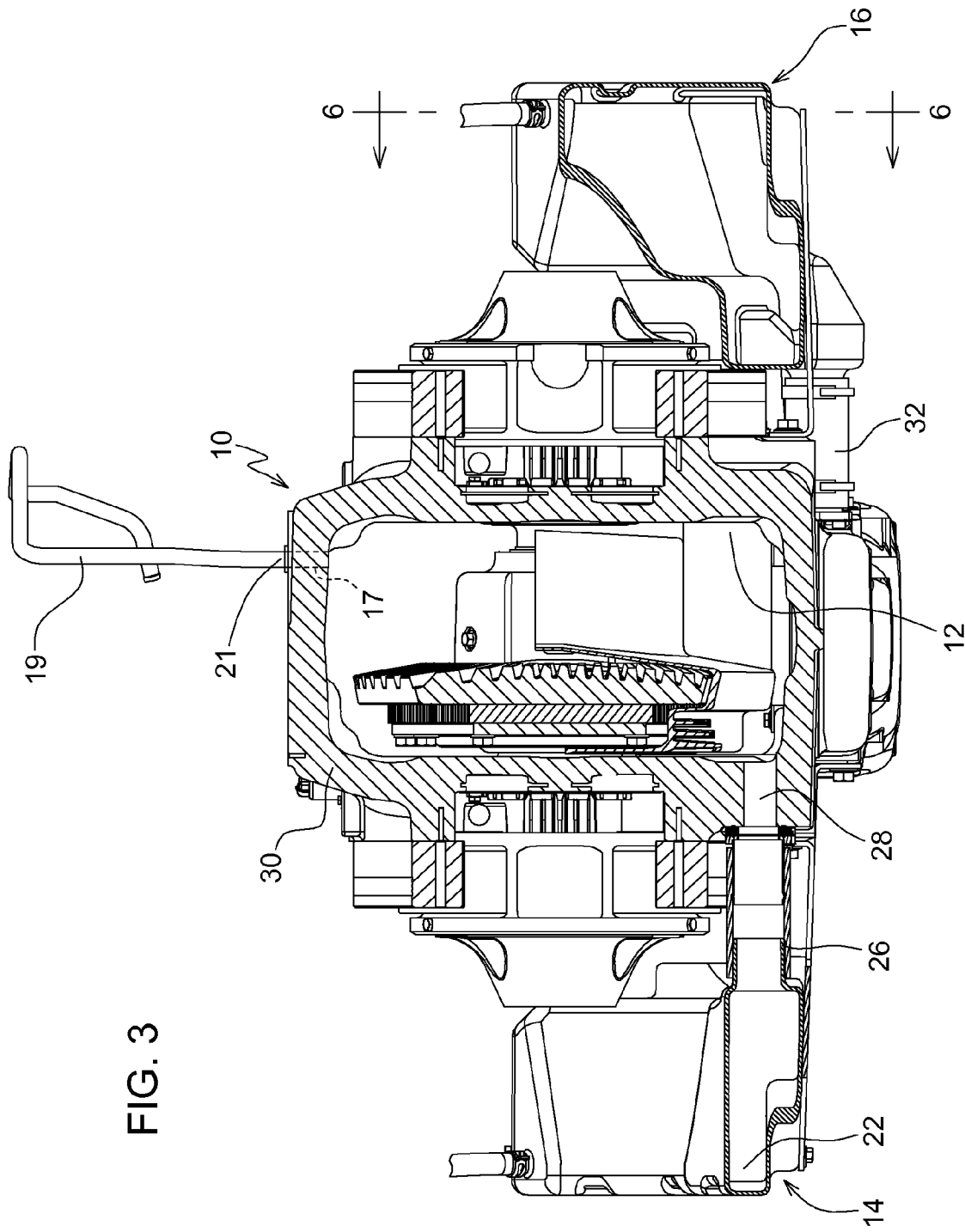
FIG. 3 is a view taken along lines 3-3 of FIG. 2.

As best seen in FIGS. 1 and 3, a main port 17 is formed in the upper part of the main reservoir 12. A main vent conduit 19 has a first end 21 which communicates the main port 17, and the main vent conduit 19 extends away from the first end 21 to a second end 23. The second end 23 may be connected to another vehicle component, such as the transmission housing (not shown), which has it's own breather vent (not shown). The main vent conduit 19 has a first resistance to air flow therethrough.

As best seen in FIG. 3, the lower portion of left auxiliary reservoir 14 is communicated to the lower portion 24 of the main reservoir 12 by a pipe 26 and a passage 28 which extends through the lower left side of the housing 30 of the differential case 10. The lower portion of right auxiliary reservoir 16 is communicated to the lower portion 24 of the main reservoir 12 by a pipe 32 and a passage (not shown) which extends through the lower right side of housing 30 of the differential case 10.

Referring to FIGS. 1 and 2, an opening or port 34 is formed in an upper portion of left auxiliary reservoir 14. A left vent pipe 36 communicates port 34 to a breather vent 38 which is communicated with the atmosphere.

Figure 4:
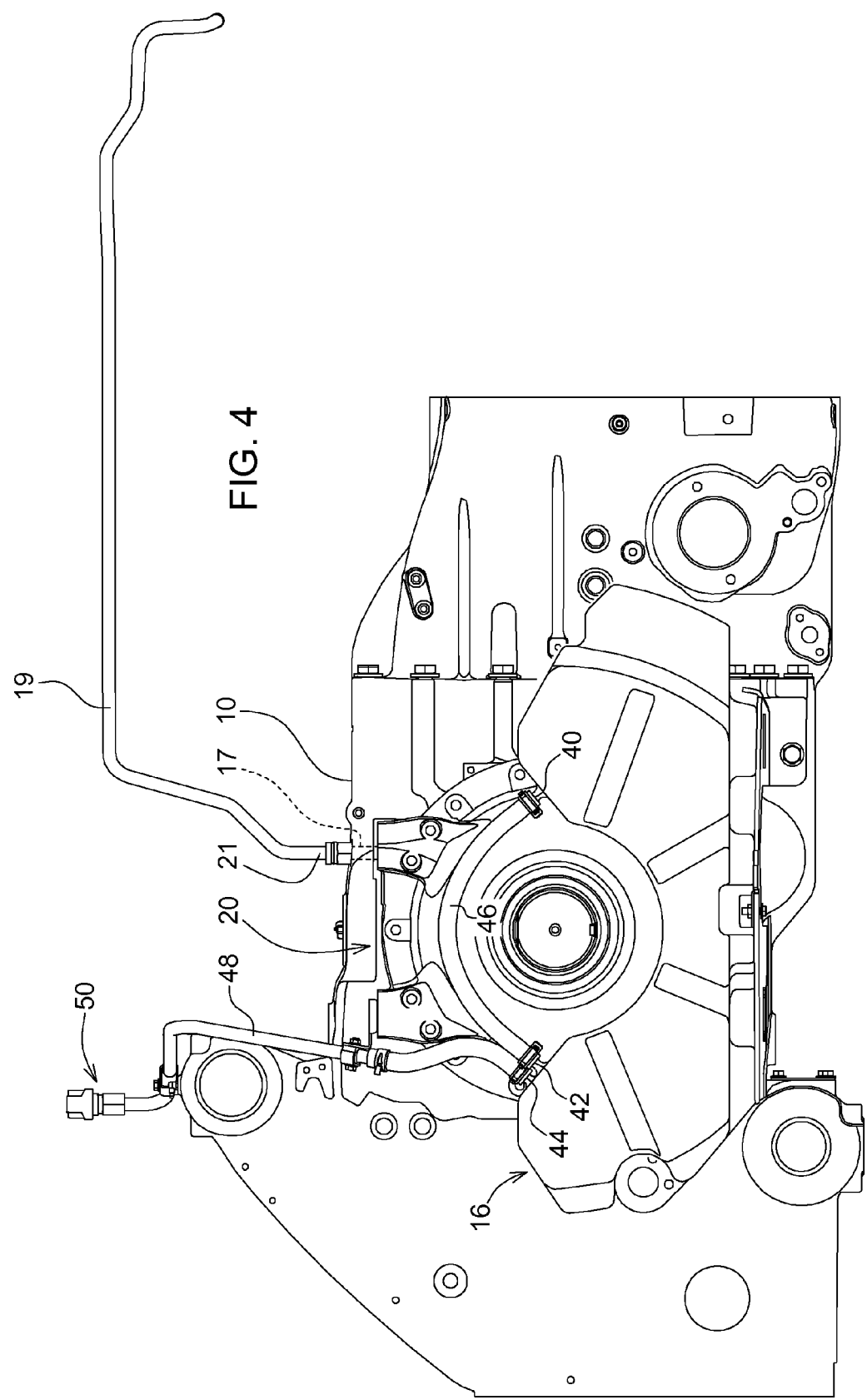
FIG. 4 is a right side view of the oil reservoir assembly of FIG. 1.

As best seen in FIGS. 4 and 6, the right auxiliary reservoir 16 encloses a chamber having a first upper chamber 15 communicated with a second upper chamber 17 through a lower chamber 19. Port 40 is formed in upper portions of chamber 15. Ports 42 and 44 are formed in upper portions of chamber 17. A vent pipe 46 communicates port 40 to port 42. A right vent pipe 48 communicates port 44 to a breather vent 50 which is communicated with the atmosphere.

Figure 5:
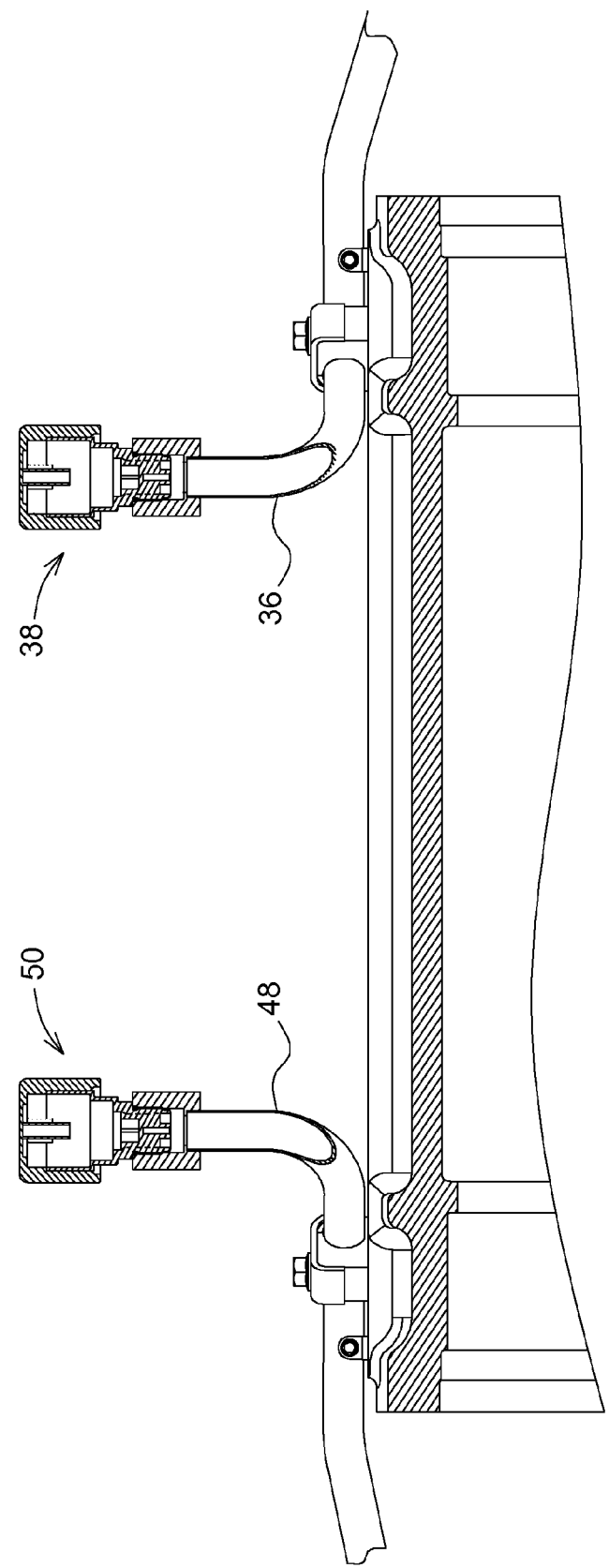
FIG. 5 is a sectional view of the breather vents of FIGS. 1 and 2.

Referring now to FIG. 5, the breather vents 38 and 50 have caps 52 which have ports 54 which communicate the interior of vent pipes 36 and 48 to the atmosphere. The breather vents 38 and 50 allow the main reservoir 10 to pull all of the oil out of the auxiliary reservoirs 14 and 16 before the main reservoir 10 is emptied. This makes a greater amount of oil available for take-out purposes, such as transferring to a remote cylinder, without changing the size or shape of the main and auxiliary reservoirs. Using the extra breather vents add minimal cost and complexity while making available the entire oil volume of the auxiliary reservoirs.

Vent conduit 19 is longer than vent pipe 36 or of vent pipe 48, and therefore has a resistance to air flow which is greater than the air flow resistance of vent pipe 36 or of vent pipe 48. As a result, the auxiliary reservoirs 14 and 16 will release fluid faster than will the main reservoir 12. The air flow resistance of the vent conduit 19 may be made greater than the air flow resistance of the vent pipe 36 or of vent pipe 48 by making the vent conduit 19 longer than vent pipe 36 or vent pipe 48, or by making the vent conduit 19 with a smaller diameter than that of vent pipe 36 or of vent pipe 48.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:
1. A reservoir assembly comprising:
    a main reservoir enclosed by a vehicle differential case, the main reservoir having a lower portion and an upper portion;
    a main port formed in an upper surface of the differential case;
    a main vent conduit having a first end which communicates with the main port, the main vent conduit extending away from the first end, the main vent conduit having a first resistance to air flow therethrough, and all of the main vent conduit being external to the differential case;
    an auxiliary reservoir mounted outboard and spaced apart from the differential case and adjacent to an axle housing, the auxiliary reservoir having a lower portion and an upper portion;
    an auxiliary port formed in an upper surface of the auxiliary reservoir, the lower portion of the auxiliary reservoir being communicated with the lower portion of the main reservoir;
    a breather vent which is in communication with atmosphere and which is spaced apart from a housing which encloses the auxiliary reservoir; and
    a vent pipe which communicates the auxiliary port with the breather vent, the vent pipe having a second resistance to air flow therethrough, the first resistance being greater than the second resistance so that fluid will release faster from the auxiliary reservoir than from the main reservoir, and all of the vent pipe being external to the differential case.

2. The reservoir assembly of claim 1, wherein:
    the auxiliary reservoir encloses a chamber having a first upper chamber communicated with a second upper chamber through a lower chamber;
    a first port is communicated with an upper portion of the first upper chamber;
    a second port is communicated with an upper portion of the second upper chamber; and
    a vent pipe communicates the first port with the second port.

* * * * *